United States Patent [19]

Dunn et al.

[11] Patent Number: 5,473,230
[45] Date of Patent: Dec. 5, 1995

[54] TORQUE DISTURBANCE PRECOMPENSATION FOR DISK DRIVE SPINDLE MOTORS

[75] Inventors: Paul F. Dunn, Longmont; David S. McMurtrey, Loveland, both of Colo.

[73] Assignee: Maxtor Corporation, Longmont, Colo.

[21] Appl. No.: 88,789

[22] Filed: Jul. 8, 1993

[51] Int. Cl.⁶ ..................................... H02P 3/00
[52] U.S. Cl. ................ 310/432; 318/632; 360/73.03
[58] Field of Search .................... 312/611, 616,
312/615, 632, 432, 617, 268–270, 66, 798–812;
388/803, 804, 902, 904, 906, 930; 360/73.01,
73.03, 73.06, 73.08, 73.07, 73.14, 78.01,
78.04, 78.06–78.07; 369/50; 364/474.14

[56] References Cited

U.S. PATENT DOCUMENTS

| | | | |
|---|---|---|---|
| 4,139,811 | 2/1979 | Klinger | 318/615 |
| 4,398,227 | 8/1983 | Anderson | 360/73.01 |
| 4,507,592 | 3/1985 | Anderson | 318/268 X |
| 4,902,949 | 2/1990 | Hirata | 318/812 X |
| 4,979,055 | 12/1990 | Squires et al. | 360/73.03 |
| 5,051,976 | 9/1991 | Kawano et al. | 369/50 |
| 5,086,421 | 2/1992 | Tateishi | 369/50 |
| 5,285,378 | 2/1994 | Matsumoto | 364/474.14 |
| 5,305,160 | 4/1994 | Funches et al. | 360/78.04 |

*Primary Examiner*—Jonathan Wysocki
*Attorney, Agent, or Firm*—Sheridan Ross & McIntosh

[57] ABSTRACT

An apparatus and method for torque disturbance precompensation in a disk drive spindle motor includes an amplifier for providing current to the spindle motor in response to an input signal. A velocity detector determines the velocity of the motor, which is then compared to a predetermined velocity to generate an error signal. Compensator elements of the control loop develop an actuating signal from the error signal. The actuating signal is then summed with a torque correction value provided by a look-up table. The torque correction value precompensates the motor by causing the amplifier to provide an additional incremented current to the motor. The additional current corrects the torque disturbance resulting from the movement of the heads across the disk.

24 Claims, 2 Drawing Sheets

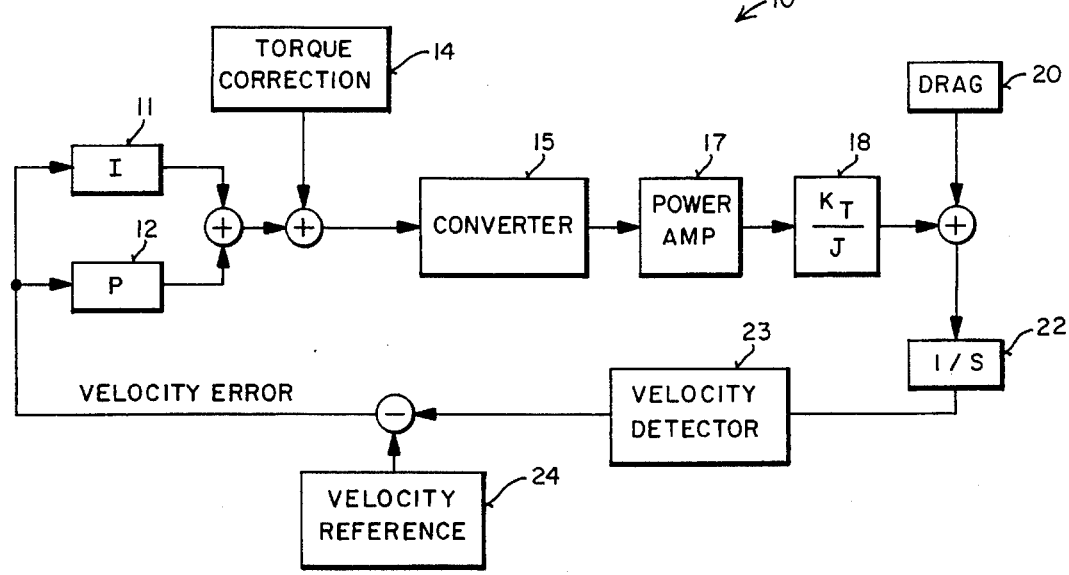
FIG_1
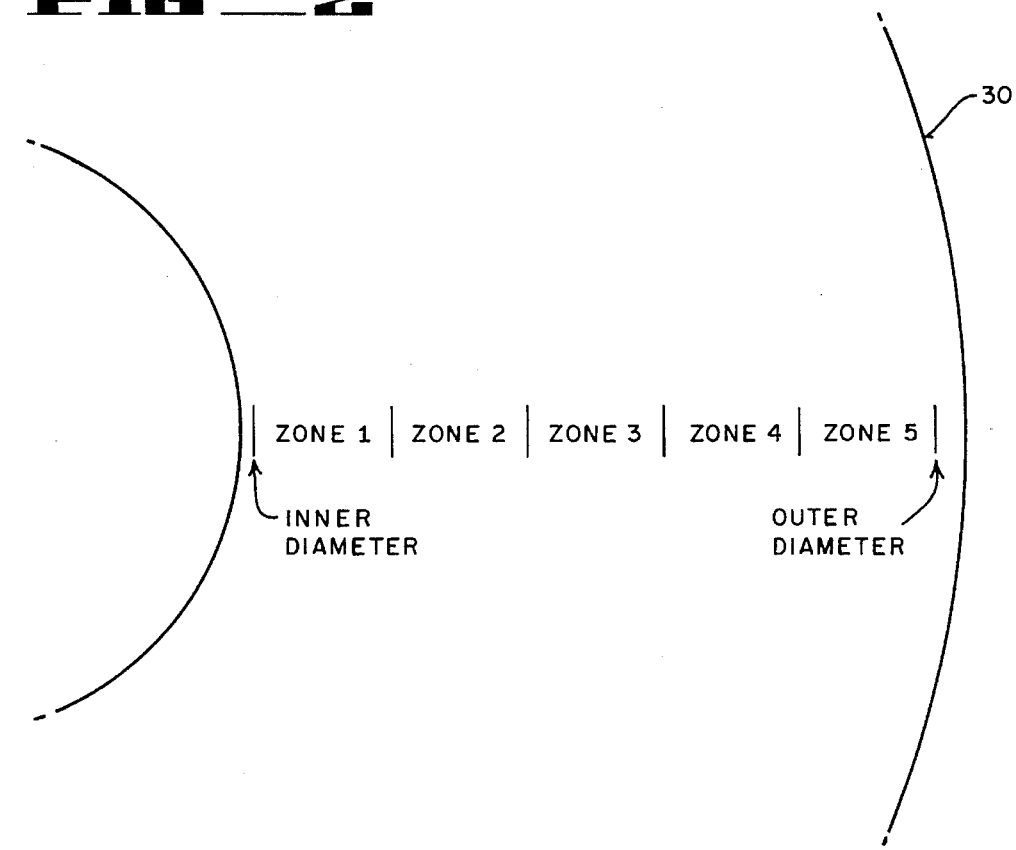
FIG_2

FIG_3
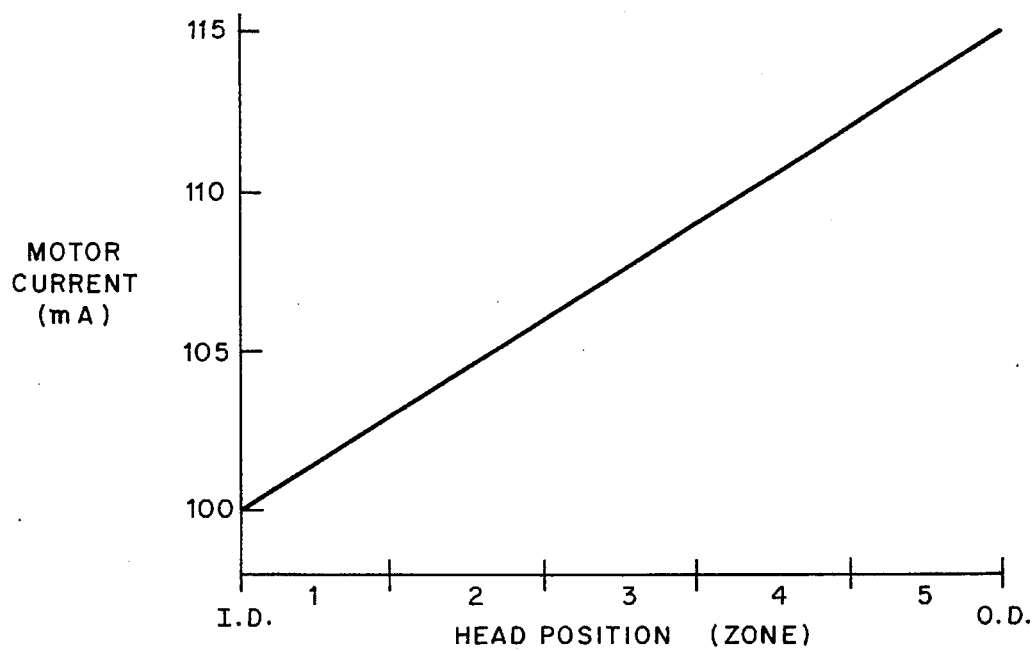
FIG_4
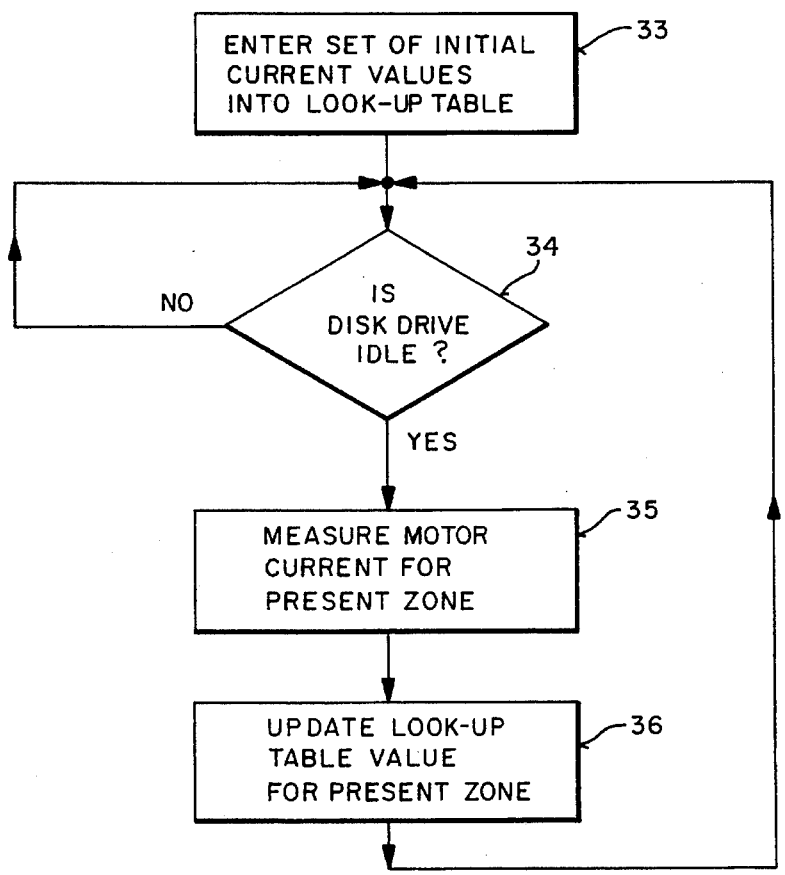

5,473,230

TORQUE DISTURBANCE PRECOMPENSATION FOR DISK DRIVE SPINDLE MOTORS

FIELD OF THE INVENTION

The present invention relates to the field of magnetic disk recording systems, more specifically, to apparatus for generating and correcting motor spin signals in rigid-disk data storage systems.

BACKGROUND OF THE INVENTION

One of the most significant innovations in the past half century has been the introduction of the rotating rigid-disk for digital data storage. In the conventional rigid-disk drive system, a transducer is supported on an air bearing slightly above the rotating disk medium. This system provides high reliability and a high data rate, and also enables fast access of data stored on the disk. The popularity of rigid-disk systems has been so great that it is now the overwhelming design of choice for on-line storage of computer data.

One of the primary requirements of a hard disk drive system is the need to maintain the spindle motor speed of the drive at a constant velocity. This generally requires the application of a steady-state current to the spindle motor, and some associated feedback correction. The feedback correction is usually in the form of a standard control loop or servo mechanism. One of the problems that arises in such a system is that the heads apply a drag force to the spindle motor. This drag force results from the interaction between the head and air that circulates around the disks as the disks rotate at high velocity. For example, modern disk drive systems typically include spindle motors which rotate at velocities of 5400 rpms or greater. Because the heads are in such close proximity to the disk surface, a frictional drag is generated on the disk due to windage.

The specific nature of the problem that arises involves the fact that the drag force on the spindle motor changes with the position of the heads from the inside diameter to the outside diameter of the disk. This is believed to be due to the fact that the velocity of the air circulating around the disk is greater at the outside diameter of the disk than at the inside diameter. As the actuator moves the heads across the disk surface, the drag induces torque disturbances which are translated into disk speed errors. Obviously, these disk speed errors must be compensated out by the control loop or servo feedback loop of the disk drive. However, this involves an associated settling time for each torque disturbance induced on the motor. Such torque disturbances are not desirable because the format of the disk requires that a certain tolerance be placed on the spindle speed accuracy. Spin errors must be accounted for in the format by leaving unused disk space. This unused disk space is wasted because it cannot be used to store data. This problem is especially acute in small form factor disk drives (e.g., drives having a disk diameter of 3.5" or less) since the torque disturbance is generally great relative to the inertia and torque of the disk assembly.

What is needed then is some way of precompensating the disk drive system for the torque disturbance which occurs as the heads traverse the disk surface in a radial direction. As will be seen, the present invention provides an apparatus and method for solving this problem by application of a predetermined torque correction value to the spindle motor during movement of the actuator.

SUMMARY OF THE INVENTION

An apparatus and method for torque disturbance precompensation for a disk drive spindle motor is described. The invention involves maintaining the speed of a disk drive motor at a predetermined velocity while effectively canceling torque disturbances to the spindle motor caused by movement of the actuator across the disk surface. When the actuator moves across the disk surface, the read/write heads induce a drag on the disk which disturbs the torque of the motor. These drag-induced torque disturbances translate into disk speed errors, which adversely effect the achievable capacity of the disk storage unit.

In one embodiment, the invention comprises a control loop which includes an amplifier means for providing current to the spindle motor in response to an input signal. Also included is a velocity detection means for determining the instantaneous velocity of the motor. The invention further comprises a means for comparing the instantaneous velocity with a predetermined velocity. In response, the comparing means produces an error signal corresponding to the difference between the instantaneous and predetermined velocities. A compensator means then develops an actuating signal from the error signal. Finally, a torque correction means provides a torque correction value to be summed with the actuating signal. The torque correction value compensates for drag-induced torque disturbances resulting from the movement of the read/write heads across the disk surface.

In one implementation, the torque correction means comprises a look-up table consisting of a set of incremental currents. Each of the incremental currents represents the additional amount of current to be supplied to the spindle motor as the actuator moves from one radial position to another. Thus, the incremental current overcomes the torque disturbance associated with a particular position of the actuator with respect to the disk surface. Typically, a reference current level is selected at a particular position on the disk surface (e.g., the inside diameter of the disk) so that each of the torque correction values represents the incremental current required at increasing diameters of the rotating disk.

BRIEF DESCRIPTION OF THE DRAWINGS

The novel features believed characteristic of the invention are set forth in the appended claims. The invention itself, however, as well as other features and advantages thereof, will be best understood by reference to the description which follows, read in conjunction with the accompanying drawings, wherein:

FIG. 1 is a block diagram showing the motor speed control loop of the present invention.

FIG. 2 illustrates a portion of the disk surface from the inside diameter to the outside diameter of the disk. The radial positions along the disk surface are shown being divided into separate zones.

FIG. 3 is a plot illustrating motor current versus head position for a typical disk drive.

FIG. 4 is a flow diagram illustrating a self-calibration routine for one embodiment of the present invention.

DETAILED DESCRIPTION

An apparatus and method for canceling torque disturbances on the spindle motor of a disk drive resulting from the drag force produced by the read/write heads is disclosed. In the following description, numerous specific details are set forth such as specific current levels, form factors, motor speeds, etc., in order to provide a thorough understanding of the invention. It will be obvious, however, to one skilled in the art that these specific details need not be used to practice the present invention. In other instances, well known circuits and methods have not been set forth in detail in order to avoid unnecessarily obscuring the present invention.

In a hard disk drive, the read/write heads normally place a drag upon the spindle motor. Basically, the relationship between motor torque, T, the drag force, F, and the radial position of the heads, R, is given by the equation T=FR. It is understood that the drag force changes with the radial position of the heads. That is, air circulating around the disks has a higher velocity near the outside diameter relative to the inside diameter of the disk surface. At the outside diameter, the air pressure on the heads causes a proportionally larger drag on the spindle motor. So, as the actuator moves across the disk surface, the drag induces torque disturbances which are then translated into disk speed errors. This is not desirable since the format of the disk requires that certain tolerances be placed on the spindle speed accuracy. Spin speed errors must be accounted for in the format by leaving unused disk space. This problem is particularly troublesome in small form factor disk drives (e.g., 3.5" or less) where the disturbance is great relative to the inertia and torque of the disk assembly.

Normally, the spin speed error that results from torque disturbances are corrected only by the proportional and integral compensator elements of the motor speed control loop. The motor speed control loop typically has a bandwidth ranging from 1–5 Hz. Thus, speed errors produced from the torque disturbances are generally corrected within the response time of the motor feedback loop. This means that there is an associated settling time when the heads move from one radial position to another radial position over the disk.

By way of example, FIGS. 2 and 3 illustrates a typical relationship between motor current as a function of head position over the disk surface. FIG. 2 illustrate a disk 30 divided into 5 separate zones, with zone 1 beginning at the inner diameter of the disk and zone 5 extending to the outer diameter of disk 30. Across these five zones, FIG. 3 illustrates the difference in motor current that must be applied to the spindle motor in order to compensate for the drag-induced torque disturbance described above. For instance, FIG. 3 shows that at the outside diameter of the disk, approximately 15 milliamperes of additional motor current is required to overcome the frictional drag on the disk moment arm, as compared to the inside diameter of the disk.

The present invention solves the problem of torque disturbance by applying a predetermined torque correction value to the spindle motor during movement of the actuator. With reference to FIG. 1, there is shown a motor speed control loop 10 of the present invention. Control loop 10 includes an ordinary power amplifier 17 supplying current to spin motor 18. Spin motor 18 is represented by the relationship $K_T/J$, where $K_T$ represents the spin motor torque constant and J represents the spindle inertia. During steady state conditions, power amplifier 17 provides a steady-state current to motor 18 to rotate the disk at a predetermined velocity(e.g., 3600 rpms or greater).

The current from amplifier 17 supplies torque to motor 18, which in turn generates acceleration of the spindle motor. Within the control loop, acceleration gets converted—via The Laplace operator shown in block 22—into velocity (i.e., frequency). At the same time, the drag from the read/write heads induces a torque disturbance which is translated into a disk speed error. This is shown in FIG. 1 where the output of block 20 is summed with the output of motor 18 prior to input into block 22. In the control loop, the velocity of the motor (including the drag component) is detected by velocity detector 23. Velocity detector 23 comprises an ordinary tachometer or other similar device which is well known in the disk drive art for detecting motor speed velocities.

The instantaneous speed of the motor detected by velocity detector 23 is then compared with a reference velocity supplied by block 24. The reference velocity provided by block 24 represents the desired spindle speed. The comparison of the reference velocity with the instantaneous velocity of the motor produces a velocity error which is input to the compensator elements of the control loop. In FIG. 1, the compensator elements is shown comprising blocks 11 and 12 representing integral and proportional compensator elements, respectively. The outputs of blocks 11 and 12 are summed with each other and then with a torque correction value provided by block 14. The key aspect of the present invention lies in the introduction of the torque correction value summed into the proportional-integral corrected actuating signal developed from the velocity error signal. The result is then converted via block 15 into an input signal to power amplifier 17 to correct the speed of motor 18. Usually, converter 15 comprises a digital to analog (D/A) converter which provides an analog signal to amplifier 17.

In one embodiment, torque correction block 14 comprises a table of correction values which represents the incremental current required to be supplied to the control loop to cancel out the torque disturbance at a particular location of the disk surface. The torque correction values can be determined or generated by observing the spindle motor load changes for multiple head positions. For example, these values can be calibrated for individual drives at drive initialization, or by generating a statistical sample applied to a number of different drives. The disk surface is then divided up into a plurality of zones, as shown in FIG. 2. For each zone, there is an associated current or incremental current value which is stored in a look-up table. As the actuator moves and the heads cross a zone boundary, the correction value applied to the motor speed control loop changes as the head position changes zones.

For example, the drive may be characterized by applying a steady-state current with the heads positioned in each zone to produce a predetermined spindle velocity. The steady-state current could then be read and stored in a look-up table, or alternatively, only the incremental difference might be stored relative to a reference value. In this respect, the reference value would represent the current supplied when the disks are in a reference position over the disk surface. Typically, the reference position is taken at the inside diameter of the disk surface.

The look-up table can be stored in a variety of ways. One possibility is to store the values associated with each of the zones in the disk drive in a read-only memory. Another alternative is to store the torque correction values on the disk surface itself. In either case, it will be appreciated by practitioners in the art that the invention actually avoids introducing transients into the control loop by commanding the correction values to the motor as the disturbance takes place, but before there is a speed error. In other words, the correction value is applied to the control loop simultaneously with changes of the head position from one zone to another. This eliminates the velocity disturbance normally caused by the settling of the torque disturbance transients in the control loop. Effectively, the torque disturbance is canceled with a torque input, resulting in no net speed change of the motor. Thus, the concept of the invention is to track the torque correction value with the drag force radially across the disk surface. As the heads cross from one zone to another, the incremental current value needed to compensate for the drag force is added to the motor. Obviously, the more zones that are defined across the disk surface, the more accurate the compensation. Although FIG. 2 illustrates five separate zones from the inside to the outside diameter of disk 30, it is appreciated that this is for illustration purposes only. Torque disturbance precompensation is possible with as little as two zones, or as many as N zones, where N is an integer ranging up to the number of tracks on the disk.

FIG. 4 illustrates a flow diagram of another implementation of the present invention. In the implementation of FIG. 4, calibration is first done as a one time event during manufacturing or testing. The steady-state current values associated with the different zone positions across the disk surface are then entered into a look-up table. This is represented in FIG. 4 by block 33. The disk drives firmware control can then be commanded to update the look-up table information during idle time of the drive. In other words, in situations where the drive is sitting idle at a particular radial position of the disk surface, the firmware control could measure the instantaneous motor speed, and then write that information to read-only memory or disk to effectively rewrite the look-up table information. If the drive is not idle, then the existing set of values stored in the look-up table can be utilized during the normal operation of the disk drive. The determination of whether the disk drive is idle is shown by decision block 34, and is ordinarily based upon the expiration of a certain predetermined time period where no seek activity takes place in the disk drive system.

Whenever the disk drive is determined to be idle, the motor current is measured for the present zone that the heads are in, as shown by block 35. Updating of the look-up table then occurs via firmware control for that zone as indicated by block 36. From this point, the drive can continue to monitor itself for an idle condition, and then update the table whenever such a condition occurs. Note that this such a scheme is well-suited for applications in which the drag force varies as a function of time. For example, where conditions such as temperature, atmospheric pressure, humidity, etc., change as a function of time, the embodiment of FIG. 4 insures that the table of correction values accurately reflects the current environmental conditions that the drive is experiencing. This is an extremely important feature, as there is a trend in the disk drive industry toward smaller and ever more portable disk storage units. Obviously, a portable disk storage unit would be subjected to a great many different environmental conditions relative to a disk storage unit installed in a stationary computer.

We claim:

1. A disk drive with a control loop for maintaining the speed of a spindle motor at a predetermined velocity comprising:

a disk with a disk surface for storing data;

a head for reading data stored on said disk surface;

a spindle motor for rotating said disk past said head;

an actuator for radially moving said head over said disk surface;

wherein, when in operation, said head creates a drag on the rotation of said disk and the amount of said drag varies depending upon the radial position of said head over said disk surface;

an amplifier for providing current to said spindle motor in response to an input signal;

velocity detection means for determining an instantaneous velocity of said spindle motor;

means for comparing said instantaneous velocity with said predetermined velocity to produce an error signal in response thereto;

a compensator for developing an actuating signal from said error signal;

means for providing a torque correction value that is used in preventing a torque disturbance to said spindle motor resulting from the change in drag caused by movement of said head across the disk surface, wherein the value of said torque correction value is dependent upon the radial position of said head over said disk surface; and means for using said error signal and said torque correction value in generating said input signal to said amplifier and thereby substantially preventing a change in the velocity of said spindle motor attributable to the change in drag caused by moving said head across said disk surface.

2. The disk drive of claim 1 wherein:

said compensator includes proportional and integral compensator elements.

3. The disk drive of claim 1 wherein:

said means for providing a torque correction value includes a table of torque correction values.

4. The disk drive of claim 1 wherein:

said means for providing a torque correction value includes means for providing a torque correction value at substantially the same time as said head moves over said disk surface.

5. The disk drive of claim 1 wherein:

said means for using comprises a digital-to-analog converter.

6. The disk drive of claim 1 wherein:

said means for providing a torque correction value includes means for generating a table of torque correction values by measuring the incremental difference in current required to maintain said predetermined velocity of said spindle motor when said head is located at a certain radial position over said disk surface relative to a reference position.

7. The disk drive of claim 1 wherein:

said means for providing a torque correction value comprises a read-only memory.

8. A method of substantially canceling torque disturbance to the spindle motor that rotates a disk in a disk drive, said disturbance resulting from the change in drag force on the disk and spindle motor produced by the head during radial movement thereof over the disk surface, the movement of the head being produced by the actuator, said method comprising the steps of:

providing a disk with a disk surface for storing data;

providing a head for reading data on said disk surface;

providing a spindle motor for rotating said disk past said head;

providing an actuator for radially moving said head over said disk surface;

wherein said head creates a drag on the rotation of said disk and the amount of said drag varies depending upon the radial position of said head over said disk surface;

defining a plurality of N radial zones on said disk surface, where N is an integer greater than 1;

providing a table of N torque correction values, each of said values representing a current to be applied to said spindle motor to compensate for head drag at a particular radial zone of the disk surface, each of said values being associated with one of said N radial zones on said disk surface;

detecting when the movement of said actuator causes said head to move from a first zone to a second zone of said disk surface;

selecting, after said step of detecting, a particular torque correction value from said table, said particular torque correction value corresponding to said second zone; and commanding said particular torque correction value to said spindle motor to substantially prevent a change in the velocity of said spindle motor attributable to the change in drag caused by moving said head across said disk surface.

9. The method according to claim 8 further comprising:

providing a control loop which detects changes in the velocity of said spindle motor and generates an error signal that is used to correct the velocity of said spindle motor; and said commanding step occurs before said control loop would otherwise detect a change in the velocity of said spindle motor attributable to the change in drag caused by moving said head across said disk surface.

10. The method according to claim 8 wherein said step of providing a table of torque correction values further comprises the steps of:

applying a steady-state current to said spindle motor to produce a predetermined velocity with said head being positioned at one of said plurality of N radial zones of said disk surface; and recording said steady-state current.

11. The method according to claim 10 wherein said step of providing a table of torque correction values further comprises the steps of:

repeating said steps of applying and recording with said head being positioned in all the other of said N radial zones.

12. The method according to claim 11 wherein:

said steady-state current recorded for each of said N radial zones corresponds to said torque correction value for that one of said N radial zones.

13. The method according to claim 8 further comprising the steps of:

measuring the motor current of said spindle motor to produce said predetermined velocity for the present radial zone at which said head is positioned;

updating the torque correction value in said table corresponding to said present radial zone based upon said measured motor current.

14. A method of substantially canceling torque disturbance on the spindle motor that rotates a disk in a disk drive, the torque disturbance resulting from the change in drag force produced by the head during radial movement thereof over the disk surface, said spindle motor being controlled by a motor speed control loop, said method comprising the steps of:

providing a disk with a disk surface for storing data;

providing a head for reading data on said disk surface;

providing a spindle motor for rotating said disk past said head;

providing an actuator for radially moving said head over said disk surface;

wherein said head creates a drag on the rotation of said disk and the amount of said drag varies depending upon the radial position of said head over said disk surface;

providing means for controlling the speed of said spindle motor;

entering a set of initial correction values in a look-up table, said values corresponding to the incremental current required to be applied to said spindle motor to maintain a predetermined velocity when said heads are at a particular radial position over the disk surface relative to a reference position;

detecting when said head moves from a present radial position to a new radial position over said disk surface;

selecting, after said step of detecting, from said look-up table the particular correction value corresponding to said new radial position; and adding said particular correction value to said control loop to precompensate said motor and thereby prevent any change in the velocity of said spindle motor attributable to the change in drag caused when moving said head across said disk surface.

15. The method of claim 14 further comprising the step of:

updating at least one of said set of initial correction values when said drive is idle.

16. The method of claim 15 wherein said updating step comprises the steps of:

measuring the spindle motor current required to maintain said predetermined velocity of said spindle motor for said present radial position of said head while said drive is idle;

changing said particular correction value corresponding to said present radial position of said head to a new correction value based on said step of measuring said spindle motor current.

17. A disk drive for a portable computer, said disk drive having at least one read/write head for writing information to and reading information from at least one magnetic disk rotatable at a constant speed by a spindle motor, said magnetic disk having at least one surface with N radial zones defined thereon, where N is an integer greater than one, said spindle motor supplied with a steady-state current by an amplifier, said constant speed maintained by a control loop comprising:

a velocity detector for measuring an instantaneous speed of said motor;

a comparator, coupled to said velocity detector, to contrast said instantaneous speed with said constant speed, said comparator producing an error signal proportional to a discrepancy between said constant speed and said instantaneous speed;

a compensator for providing said amplifier with an actuating signal proportional to said error signal; and a memory containing a plurality of N correction values for said steady state current, each of said N radial zones having a corresponding correction value located in said memory;

means for adding one of said plurality of N correction values to said error signal at a time that substantially prevents a change in motor speed attributable to the change in drag resulting from movement of said at least one read/write head over said at least one magnetic disk.

18. The disk drive of claim 17 wherein said control loop further includes a firmware control coupled to said memory and programmed to:

measure a new steady state current required to maintain said constant speed when said read/write head is located in a particular zone of said magnetic disk while said disk drive is idle; and change one particular correction value stored in said memory and corresponding to said particular zone to a new correction value based on said new steady state current.

19. A disk drive, comprising:

a disk with a disk surface for storing data;

a head for reading data stored on said disk surface;

a spindle motor for rotating said disk past said head;

means for radially moving said head from a first radial position over said disk surface to a second radial position over said surface;

wherein, when in operation, said head creates a drag on said disk and the amount of said drag varies depending upon the radial position of said head over said disk surface;

wherein, when in operation, the change in the drag produced when the radial position of said head changes can create a torque disturbance that changes the rotational velocity of said spindle motor; and means for substantially preventing a change in the rotational velocity of said spindle motor attributable to a change in drag produced by said head when the radial position of said head over said disk changes.

20. A disk drive, as claimed in claim 19, wherein:

said means for substantially preventing includes means for providing a drag induced torque correction value that is related to the radial position of said head over said disk surface.

21. A disk drive, as claimed in claim 20, wherein:

said means for providing a drag induced torque correction value includes a look-up table for storing a plurality of drag induced torque correction values, each value corresponding to radial position on said disk surface.

22. A disk drive, as claimed in claim 21, wherein:

said means for providing a drag induced torque correction value includes means for updating said look-up table.

23. A disk drive, as claimed in claim 19, wherein:

said means for substantially preventing includes means for providing a drag induced torque correction value at substantially the same time as said head is being moved from a first radial position to a second radial position.

24. A disk drive, as claimed in claim 19, further comprising:

means for detecting a change in the rotational velocity of said spindle motor and generating a rotational velocity error signal; and means for summing said rotational velocity error signal and a drag induced torque correction signal produced by said means for preventing.

* * * * *